United States Patent [19]

Fjällbrant

[11] B 3,927,378

[45] Dec. 16, 1975

[54] DEMODULATOR

[75] Inventor: Tore Torstensson Fjällbrant, Hovas, Sweden

[73] Assignee: Telefonaktiebolaget L M Ericsson, Stockholm, Sweden

[22] Filed: Aug. 10, 1973

[21] Appl. No.: 387,363

[44] Published under the Trial Voluntary Protest Program on January 28, 1975 as document no. B 387,363.

Related U.S. Application Data

[63] Continuation-in-part of Ser. No. 195,332, Nov. 3, 1971, abandoned.

[30] Foreign Application Priority Data

Nov. 23, 1970 Sweden ............................ 15810/70

[52] U.S. Cl. ................ 329/145; 328/151; 329/146; 329/168

[51] Int. Cl.[2] ........................ H03D 1/06; H03K 5/18

[58] Field of Search ............ 329/145, 146, 168–173; 328/151

[56] References Cited

UNITED STATES PATENTS

| | | | |
|---|---|---|---|
| 3,504,289 | 3/1970 | Pfeiffer et al. | 328/151 X |
| 3,714,464 | 1/1973 | Nutt | 328/151 X |

*Primary Examiner*—Alfred L. Brody

*Attorney, Agent, or Firm*—Hane, Baxley & Spiecens

[57] ABSTRACT

A demodulator for the demodulation of sampled signals which resulted from the periodically varying sampling of an analog signal comprises a summing circuit, a feedback circuit and a low-pass filter. The input of the demodulator is connected to one input of the summing circuit, the low-pass filter is connected between the output of the summing circuit and the output of the demodulator and the feedback circuit is connected between the low-pass filter and the input of the summing circuit. Samples corresponding to excluded samples in the sampling patterns of the signals fed to the demodulator as compared with sampling patterns of uniformly occurring sampled signals are transferred to the summing circuit via the feedback circuit.

6 Claims, 5 Drawing Figures

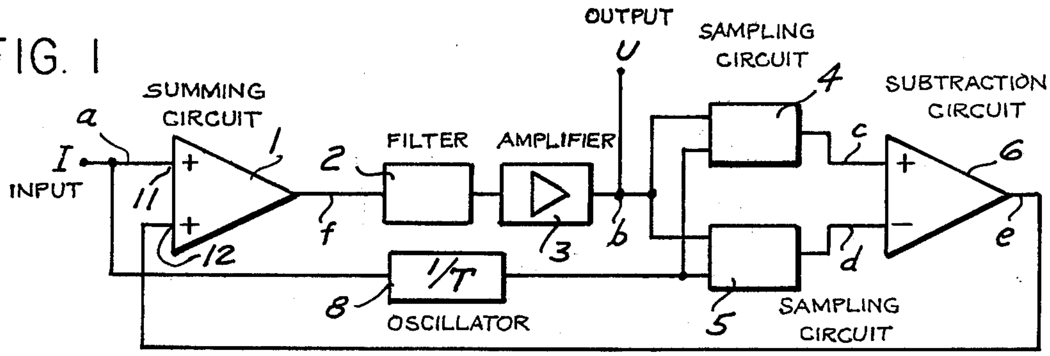
FIG. 1
FIG. 2 a-f
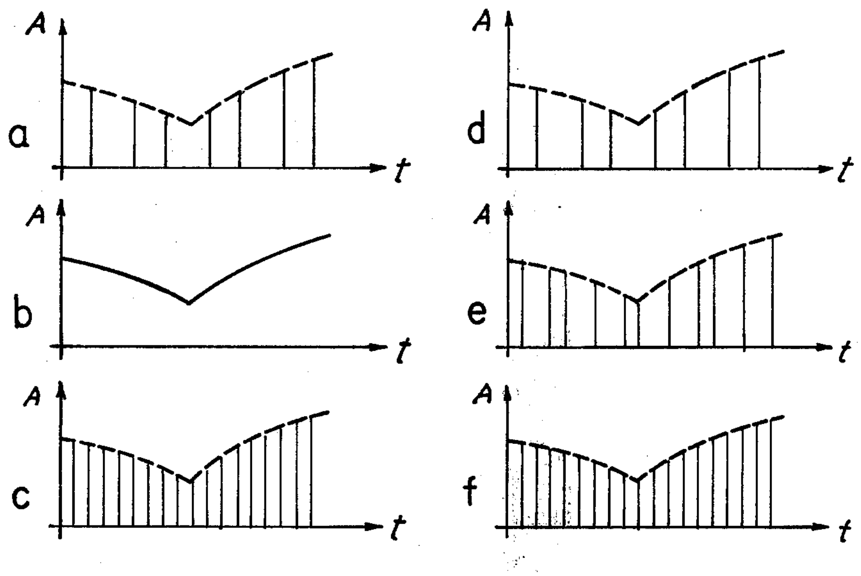
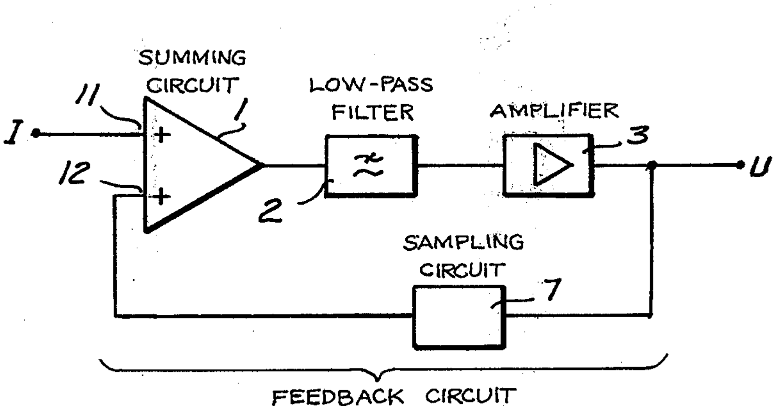
FIG. 3

DEMODULATOR

This application is a continuation-in-part of application Ser. No. 195,332, filed Nov. 3, 1971, now abandoned.

The present invention relates to a demodulator, and more precisely to a demodulator for demodulation of sampled signals which resulted from a periodically varying sampling of an analog signal.

It is known from pulse amplitude modulation techniques that a frequency band limited analog signal such as a speech signal can be transferred as short pulses with constant pulse interval T and with an amplitude equal to the instantaneous amplitude of the analog signal. Such an operation can be called sampling, and such pulse signals can be called sampled signals. It is also known that the pulse repetition frequency 1/T must have a lowest value which is equal to twice the highest signal frequency component in the analog signal and that the analog signal may be recaptured of demodulated from the sampled signal by means of a low-pass filter with the limiting frequency ½T.

A demodulator according to the invention is utlized for reconstructing analog signals from signals resulting from a varying sampling, i.e., the sampling interval periodcally varies. Such varying sampling can, for example, have the sampling intervals 2T, 3T, 2T, 3T . . . . or 10T, 11T, 10T, 11T. . This type of sampling interval, i.e., $n$ T, $(n+1)$T, $n$ T, $(n+1)$T. . . is especially suitable for information transfer, but other forms of periodically varying sampling come within the scope of the invention. In spite of the fact that the shortest sampling interval in such a type of sampling is a multiple of the base interval T, signals can be sampled with frequencies within the frequency range 0 to ½T, provided however that the frequency spectrum of the analog signal is slowly varying, i.e., the frequency components are approximately constant during a time which is long compared with the time period for the highest frequency of the signal. An example of signals of such character is speech signals. Frequencies up to 3 and 4 kHz must be sampled, but since the variation of frequency components is dependent on the muscle variations in the speech organ. Such variations are relatively slow.

The advantage in the use of a periodically varying sampling is that the smallest sample interval can be much greater than what is required with uniform sampling. Thus, because of the long time intervals between samples of first analog signals, signal samples of other analog signals can be interleaved therewith (time multiplex) so that the effectiveness of the transfer means can be considerably increased. It is, however, not possible — as in uniform sampling — to recapture the continuous signal by simple low-pass filtering.

An object of the present invention is to provide a demodulator for the demodulation of sampled signals which arose from the periodically varying sampling of an analog signal.

The invention is described in greater detail in connection with the accompanying drawing where:

FIG. 1 shows schematically a block diagram of a demodulator in accordance with the invention;

FIG. 2 shows signal waveforms at particular points in the demodulator according to FIG. 1;

FIG. 3 shows a variation of the demodulator according to FIG. 1;

Figure 4:
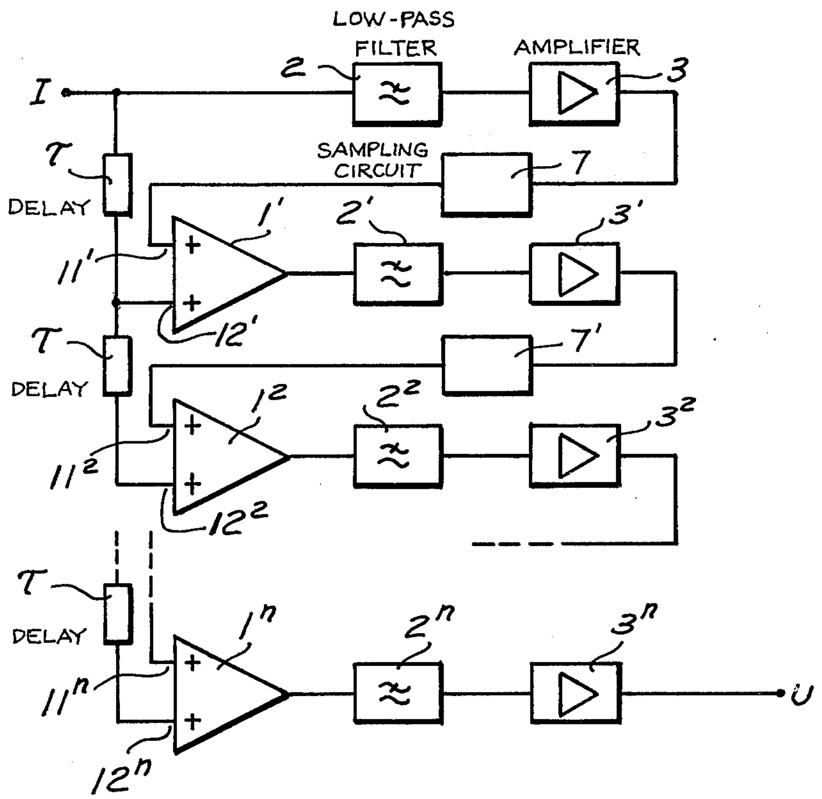
FIG. 4 shows a demodulator with a number of summing circuits and associated filters.

The demodulator shown in FIG. 1 of the drawing has: summing circuit 1 with two inputs and one output; a low-pass filter 2 and associated amplifier 3, and a feedback circuit including a sampling circuit 4 for uniform sampling; a sampling circuit 5 for varying sampling; a subtraction circuit 6 and a connection between the output of subtraction circuit 6 and the input 12 of summing circuit 1.

Input 11 of summing circuit 1 is the input I of the demodulator. The output of summing circuit 1 is connected via filter 2 to amplifier 3. The output of amplifier 3 which is the output U of the demodulator is also connected to the circuits for uniform sampling 4 and varying sampling 5. The sampling circuit 4 for uniform sampling is connected between the output of the amplifier 3 and the plus-input of the subtraction circuit 6, while the sampling circuit 5 for varying sampling is connected between the output of the same amplifier and the minus-input of the same subtraction circuit.

To control the timing of the sampling circuits 4 and 5, oscillator 8 generates sampling pulses having a repetition rate 1/T. Oscillator 8 is synchronized to the input data signals by having a synchronizing input connected to input I of the demodulator. Alternatively, the output of a master clock generating pulses with a repetition rate 1/T can be fed to both the modulator (not shown) and to the sampling circuits 4 and 5. The sampling circuit 4 for uniform sampling can be a two-input AND-circuit with a first input connected to output of amplifier 3 and a second input connected to the output of oscillator 8. Sampling circuit 5 for periodically varying sampling can also be a two-input AND-circuit having one input connected to the output U of amplifier 3 and a second input connected to a two-input OR-circuit. The first input of the OR-circuit can be connected to the $n$th output of a $(n)+(n+1)$ stage ring counter while the second input is connected to the last stage of the counter. The counter is driven by oscillator 8 at a pulse repetition rate 1/T. Thus, if the ring counter is a five-stage counter with outputs at the second ($n$) and last $(n)+(n+1) = 2n+1 =$ 5th stage, the sampling will occur at 2T, 3T, 2T, . . .

Thus, the varying sampling performed in the circuit 5 is of the same character as the sampling which is the basis of the varying sampled signal with the sampling interval n T, $(n+1)$T, $n$ T, $(n+1)$T . . . fed to the input I of the demodulator. The uniform sampling executed in the circuit 4 has in this case the sampling interval T as the varying sampling has sampling intervals which are multiples of T. The band width of the low-pass filter 2 is ½T. The voltage amplification of the amplifier 3 is so adapted that the amplitude of the sample after the subtraction circuit 6 is equal to the amplitude of the samples fed to the input of the demodulator.

Of the diagrams, in FIG. 2 the diagram $a$ shows the varying sampled signal fed to the demodulator, the diagram $b$ the signal at the output U of the amplifier 3, the diagram $c$ the uniformly sampled signal at the output side of the sampling circuit 4, the diagram d the varying sampled signal at the output side of the sampling circuit 5, the diagram $e$ the signal after the subtraction circuit 6, and the diagram $f$ the resultant uniformly sampled signal obtained from the varying sampled input signal. The signals relate to the steady state condition.

The demodulator according to FIG. 3 is a simplification of the drawing of the modulator of FIG. 1, and comprises an addition circuit 1, a filter 2 and an amplifier 3. Between the output U of the amplifier 3 and the input 12 in the summing circuit 1 a sampling circuit 7 for similar sampling is connected and comprises circuits 4, 5 and 6 of FIG. 1. This sampling occurs according to a sampling pattern which comprises samples excluded in the sampling patterns of the sampled signals fed to the demodulator compared with sampling patterns of similar sampled signals.

The demodulator according to FIG. 4 comprises a number of summing circuits which are denoted $1^1$, $1^2$, . . . . $1^n$. The input I of the demodulator is connected on the one hand direct to a low-pass filter 2 with associated amplifier 3 and sampling circuit 7, and on the other hand via a time delay circuit $\tau$ to an input $12^1$ of the summing circuit $1^1$ which input corresponds to the input 12 in FIG. 3. The time delay in the circuit corresponds to the time delay in the loop which is formed of units 2, 3 and 7 between the input I and the remaining input $11^1$ of the summing circut $1^1$. The input $12^1$ is connected via a time delay circuit $\tau$ to an input $12^2$ in the summing circuit $1^2$. The output of the summing circuit $1^1$ is connected via a low-pass filter $2^1$ with the following amplifier $3^1$ and sampling circuit $7^1$ to a remaining input $11^2$ of the addition circuit $1^2$ . In the same manner the input $12^2$ of the summing circuit $1^2$ and the output are then connected to the two inputs of a following summing circuit. The last summing circuit $1^n$ has its output connected to the output U of the demodulator via a low-pass filter $2^n$ and an amplifier $3^n$. The number of summing circuits and, in this connection, the number of loops 2, 3, 7 of the demodulator depend on and increase with the number of samples which are missed in the sampling pattern of the fed signal and is also a consequence of required demands of freedom from distortion in the output signal of the demodulator.

Figure 5:
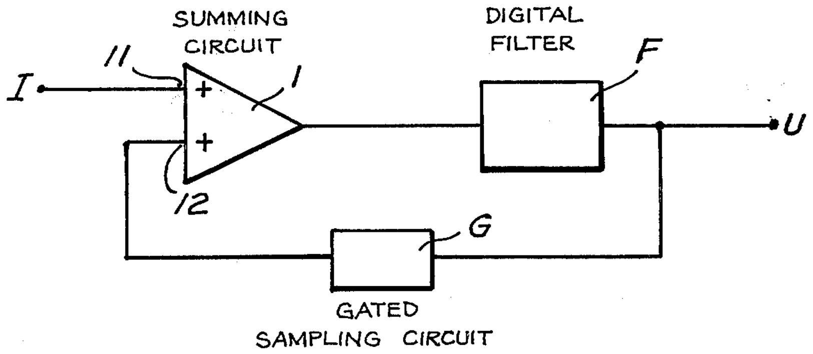
FIG. 5 shows another modified embodiment of the modulator according to FIG. 1.

The demodulator according to FIG. 5 comprises summing circuit 1 with two inputs 11, 12 and an output and a filter arrangement F connected between the output of the running circuit 1 and the output U of the demodulator. The input I of the demodulator is connected to the input 11 of the summing circuit 1, and between the output of the filter arrangement F and the input 12 of the summing circuit 1 there is a circuit G for the transferring of samples corresponding to excluded samples in the sampling patterns of the signals fed to the input I of the demodulator compared with the sampling pattern of the uniformly sampled signals.

In FIGS. 1, 3 and 4, the low-pass filters are considered to be ordinary analog filters. It is, however, possible to realize them with "sample-and-hold" circuits, i.e., circuits with, for example, switches and capacitors which are charged to a certain value and then keep this value during the interval between two samples. In such case it is desirable to feed to the addition circuit not only the samples which are missed in the pattern of the input signal, but also samples between the samples in such a completed signal so that in this connection a higher sampling frequency is obtained. In this way phase shifting of the filter is reduced and still a uniformly sampled signal is obtained out of the demodulator.

In the demodulator according to FIG. 5 the filter F is considered to be of digital type constructed of delay units, amplifiers and summing circuits. The circuit G is then constructed as a gate arrangement where the required sampling pattern is formed by passing certain samples and blocking others so that the varying sampled in-signal is transformed to a uniformly sampled out-signal.

What is claimed is:

1. A demodulator for demodulating input signals which resulted from the variably sampled in a periodic manner of an analog signal comprising: a demodulator input being adapted to receive the input signals; a demodulator output; a summing circuit having two inputs and an output, first connecting means for connecting said demodulator input to one of the inputs of said summing circuit; second connecting means for connecting the output of said summing circuit to said demodulator output; and sampling means, said sampling means comprising a subtraction circuit having first and second inputs and an output, said output being connected to said other input of said summing circuit, a first sampling circuit connected between said demodulator output and the first input of said subtraction circuit for uniformly sampling signals, and a second sampling circuit connected between said demodulator output and the second input of said subtraction circuit for sampling signals according to the same sampling pattern associated with the input signals.

2. The demodulator according to claim 1 wherein said second connecting means comprise a low-pass filter means.

3. The demodulator according to claim 1 wherein said sampling means operate at a faster pulse repetition rate than the pulse repetition rate associated with the uniformly sampled signals.

4. A demodulator for demodulating input signals which resulted from the variably sampled in a periodic manner of an analog signal comprising a demodulator input being adapted to receive the input signals, a demodulator output, a summing circuit having two inputs and an output, first connecting means including a signal delay means for connecting said demodulator input to one of the inputs of said summing circuit, second connecting means for connecting the output of said summing circuit to said demodulator output, sampling means connected to the other input of said summing circuit, said sampling circuit means including means for feeding to the said other input sampled signals corresponding to excluded samples in the sampling patterns associated with the sampling patterns of uniformly sample signals, and low-pass filter means connecting said demodulator input to said sampling means.

5. A demodulator for demodulating input signals which resulted from the variably sampled in a periodic manner of an analog signal comprising: a demodulator input being adapted to receive the input signals; a demodulator output; a first summing circuit having two inputs and an output; a first signal delay means for connecting said demodulator input to one of the inputs of said first summing circuit; a second summing circuit having two inputs and an output; a second signal delay means for connecting said demodulator input to one of the inputs of said second summing circuit; a first low-pass filter means and a first sampling means connected in series from the output of said first summing circuit to the other input of said second summing circuit; means connecting the output of said second summing circuit to said demodulator output; second sampling means connected to the other of said first summing circuit, said second sampling means including means for feeding to the said other input sampled signals corresponding to excluded samples in the sampling patterns associated with the sampling patterns of uniformly sample signals; a third low-pass filter means connecting said demodulator input to the input of said second sampling means.

6. A demodulator for demodulating input signals which resulted from the variably sampled in a periodic manner of an analog signal comprising: a demodulator input being adapted to receive the input signals; a demodulator output, a summing circuit having two inputs and an output; first connecting means for connecting said demodulator input to one of the inputs of said summing circuit; a digital filter means connecting the output of said summing circuit to said demodulator output, and sampling circuit means including gating means connected between said demodulator output and the other input of said summing circuit, said sampling circuit means including means for feeding to the said other input sampled signals corresponding to excluded samples in the sampling patterns associated with the sampling patterns of uniformly sample signals.

* * * * *